United States Patent [19]

Freudenberger

[11] Patent Number: 5,298,925
[45] Date of Patent: Mar. 29, 1994

[54] LEAD POSITIONER FOR A PENCIL PLOTTER

[75] Inventor: Richard Freudenberger, Fountain Valley, Calif.

[73] Assignee: CalComp Inc., Anaheim, Calif.

[21] Appl. No.: 848,589

[22] Filed: Mar. 9, 1992

[51] Int. Cl.$^5$ .................. G01D 15/16; B43L 13/00
[52] U.S. Cl. ..................... 346/139 R; 33/18.1
[58] Field of Search ............ 346/139 C, 139 R, 49, 346/29; 33/18.1, 18.2; 401/85, 88, 89, 53, 65, 67; B43L 13/00; G01D 15/16

[56] References Cited

U.S. PATENT DOCUMENTS

| | | | |
|---|---|---|---|
| 4,991,300 | 2/1991 | Takahashi | 33/18.2 |
| 5,179,393 | 1/1993 | Takahashi | 346/139 R |

*Primary Examiner*—Benjamin R. Fuller
*Assistant Examiner*—Alrick Bobb
*Attorney, Agent, or Firm*—Frederic P. Smith; William F. Porter, Jr.

[57] ABSTRACT

A lead positioner for a pencil plotter in which a lead stocker contains a plurality of leads for use in a pencil plotter, a lead actuator mechanism is coupled to the lead stocker and is adapted to release the leads into a lead holder, and a shaker is provided coupled to the lead stocker and adapted to enable the leads to be released individually into the lead holder. In a particular embodiment, the shaker imparts a vibrational motion to the lead stocker prior to the lead actuator mechanism releasing the leads to enable the leads to be released individually. The shaker is further adapted to provide a translational motion to the lead stocker to align the leads and the lead holder and, in addition, to enable the lead actuator mechanism to release the leads into the lead holder.

9 Claims, 3 Drawing Sheets

LEAD POSITIONER FOR A PENCIL PLOTTER

BACKGROUND OF THE INVENTION

1. Field of the Invention

This invention relates to the field of pencil plotters and, in particular, to a lead positioner for a pencil plotter in which a shaker mechanism enables leads to be individually released from a lead stocker into a lead holder.

2. Description of the Related Art

The use of pencil plotters has increased significantly in the making of graphics and drawings due to the ability of designers and draftsmen to be able to make alterations or corrections to such graphics and drawings. In order to increase the flexibility of the pencil plotters, it is desirable that lead holders carrying different hardnesses or colors of lead be able to be easily placed into and removed from the pencil carriage. In addition, it is necessary to have a mechanism for being able to replace the lead in a lead holder by a lead of the same hardness or color when the lead has been used up. The latter problem has been generally solved by having a plurality of removable lead holder carousels, each one holding a plurality of lead holders of the same kind. When the lead in a lead holder is used up, the lead holder in the pencil carriage is replaced by a lead holder in the carousel. When a lead of different hardness or color is desired, the lead holder is transferred from the pencil carriage to the carousel and the carousel is replaced with a carousel carrying lead holders having the desired hardness or color. More recently, plotter designs have been introduced having a single carousel carrying a plurality of lead holders of differing hardnesses and colors and having the positions of the lead holders indexed so that the pencil carriage can receive a lead holder carrying a lead of desirable hardness of color. The problem still remained, however, of replacing a lead when it had been used up without having to replace the entire carousel with a new carousel in which the leads have been renewed.

In order to solve such lead replacement problem, the use of lead stockers has been employed. Such lead stockers are similar to lead holder carousels in that they are rotatable and carry a plurality of chambers or magazines into which a plurality of replacement leads of differing hardnesses and colors can be inserted. In theory, the rotatable lead stocker can be indexed to the rotatable lead holder carousel and a lead of proper hardness or color can be transferred into the corresponding lead holder when its lead has run out. In practice, however, problems have arisen in the mechanization of the transfer process, particularly in assuring that a single lead from the plurality of replacement leads will, in fact, be ready to be transferred from the lead stocker chamber into the lead holder and that the lead stocker is properly positioned with respect to the lead holder when the lead is to be transferred from the lead stocker to the lead holder. While various jolting or bumping techniques have been tried to free a single lead and various motorized positioning techniques have been employed to ensure a proper positioning of the lead holder and lead stocker before lead transfer, these techniques have been found lacking in consistency and reliability.

Thus, it is a primary object of the present invention to provide an improved lead positioner for a pencil plotter.

It is another object of the present invention to provide an improved lead positioner for a pencil plotter which assures a reliable transfer of lead from a lead stocker to a lead holder.

It is a further object of the present invention to provide an improved lead positioner which enables a single lead from a plurality of leads in a lead stocker chamber to be consistently transferred to a lead holder.

It is still another object of the present invention to provide an improved lead positioner which assures that a lead stocker is properly positioned with respect to a lead holder when a lead is to be transferred from the lead stocker to the lead holder.

SUMMARY OF THE INVENTION

A lead positioner for a pencil plotter is provided in which a lead stocker contains a plurality of leads for use in a pencil plotter, a lead actuator mechanism is coupled to the lead stocker and is adapted to release the leads in to a lead holder, and a shaker means is provided coupled to the lead stocker and adapted to enable the leads to be released individually into the lead holder. In a particular embodiment, the shaker means imparts a vibrational motion to the lead stocker prior to the lead actuator mechanism releasing the leads to enable the leads to be released individually into the lead holder. The shaker means is further adapted to provide a translational motion to the lead stocker to align the leads and the lead holder and, in addition, to enable the lead actuator mechanism to release the leads into the lead holder.

The novel features which are believed to be characteristic of the invention, both as to its organization and method of operation, together with further objects and advantages thereof, will be better understood from the following description in connection with the accompanying drawings in which the presently preferred embodiments of the invention are illustrated by way of example. It is to be expressly understood, however, that the drawings are for purposes of illustration and description only and are not intended as a definition of the limits of the invention.

DESCRIPTION OF THE PREFERRED EMBODIMENT

Figure 1:
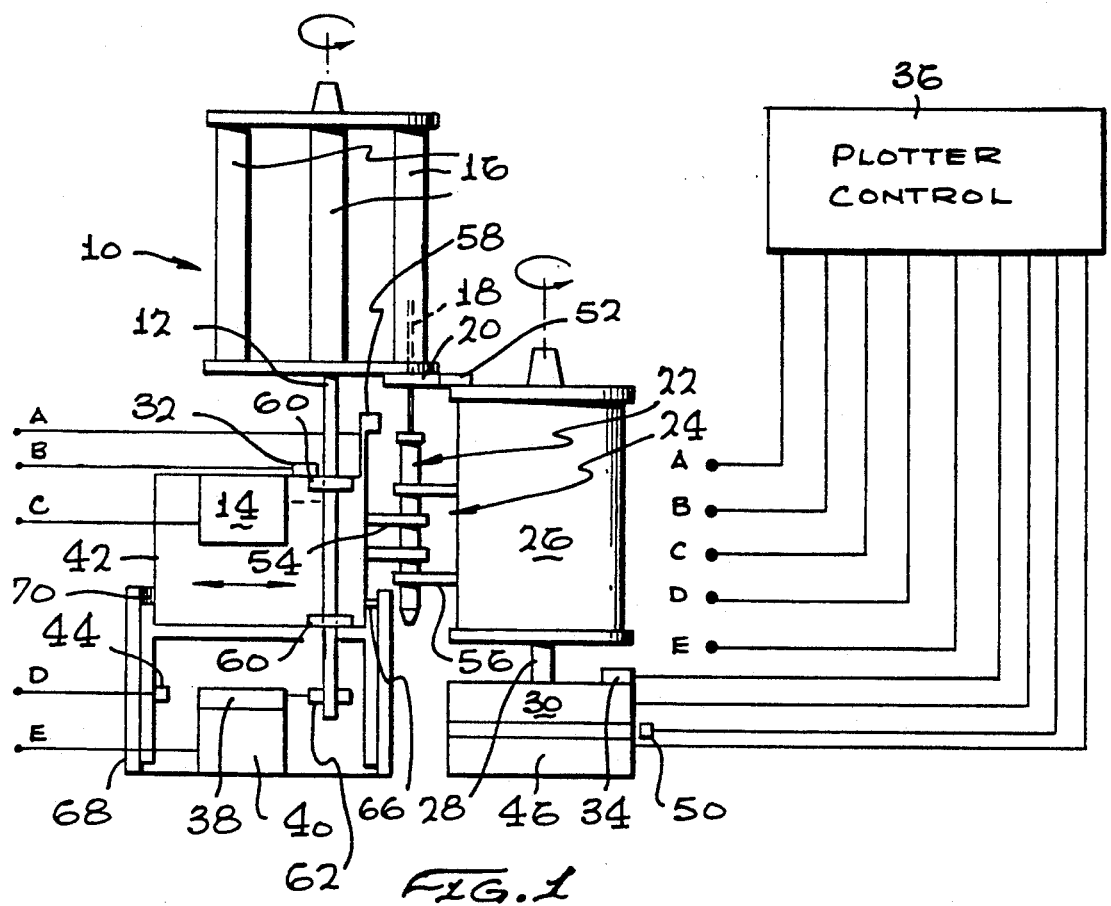
FIG. 1 is a simplified view of the lead loader and positioner mechanism coupled to electronics suitable for the operation of the present invention.

Referring now to FIG. 1, a lead stocker 10 is shown mounted on shaft 12 and rotationally driven by motor 14. The lead stocker 10 has a plurality of lead storage chambers or magazines 16 each of which holds a plurality of leads 18. The leads 18 in each lead chamber 16 are of the same color or hardness, but each of the lead chambers 16 generally contains leads 18 of differing color or hardness. The leads 18 are individually dropped by lead actuator mechanism 20 into lead holder 22 which is held or supported by a finger mechanism 24 extending from a rotatable carousel 26. The finger mechanism 24 may be of the type shown in my copending patent application, Ser. No. 07/834,967, filed Feb. 14, 1992, entitled "finger Mechanism for a Lead Holder", assigned to the same assignee as the present invention. The carousel 26 is mounted on shaft 28 and is rotatable driven by motor 30. The rotational positions of lead stocker 10 and carousel 26 are sensed by sensors 32, 34. The outputs of sensors 32, 34 are coupled to plotter control 36 which in turn provides appropriate outputs to stocker motor 14 and carousel motor 30 to coordinate the rotational positions of lead stocker 10 and carousel 26, as desired.

In operation, as will be shown in greater detail hereinafter, the lead stocker 10 and the carousel 26 are moved into proper position with respect to one another to enable the lead actuator mechanism 20 to drop a lead 18 into the lead holder 22. In a first embodiment, this is accomplished by an eccentrically mounted cam 38, driven by motor 40, translating cam follower 62 coupled to shaft 12, lead stocker 10 and motor 14 mounted on a slidable, spring-loaded support 42 toward carousel 26. Sensor 44 determines the position of cam 38 and provides an output to plotter control 36 which provides an appropriate output to cam motor 40 to rotate cam 38 and translate lead stocker 10 toward carousel 26. Cam 38 also has a plurality of loops thereon and thus acts as a shaker mechanism to provide a vibrational motion to the lead stocker 10 to enable the leads 18 to be released individually into the lead holder 22 by the lead actuator mechanism 20. In a second embodiment, carousel 26 is translated toward lead stocker 10 by motor 46, with carousel 26, shaft 28 and motor 30 being mounted on a slider mechanism 48 shown in greater detail hereinafter. Sensor 50 senses the position of slider mechanism 48 and provides an output to plotter control 36 which provides an appropriate output to slider motor 46 to translate carousel 28 toward lead stocker 10 and to stop such translation when all elements are in their final and proper position. In this particular embodiment, cam 38 is concentrically mounted but continues to provide the aforementioned vibrational motion to lead stocker 10.

When the lead stocker 10 and the carousel 26 are approaching one another, the lead actuator mechanism 20 is engaged by pusher rod 52 mounted on and extending from carousel 26 and the index features 54 extending from the support 42 engage the lead holder 22 held by finger mechanism 24 which has its own index features 56 positioning lead holder 22. At the precise moment when the lead stocker 10, the carousel 26 and the lead holder 22 are properly positioned and aligned, pusher rod 52 causes lead actuator mechanism 20 to reach a condition where a lead 18 is allowed to drop into lead holder 22. This lead transfer is sensed by sensor 58 which provides an output to plotter control 36 to cause the lead stocker 10 or the carousel 26 to move back to its initial position and await further instructions. If no lead transfer is sensed, the procedure may be repeated until a lead is transferred or a signal may be given to an attendant to examine the mechanism or both.

Figure 3:
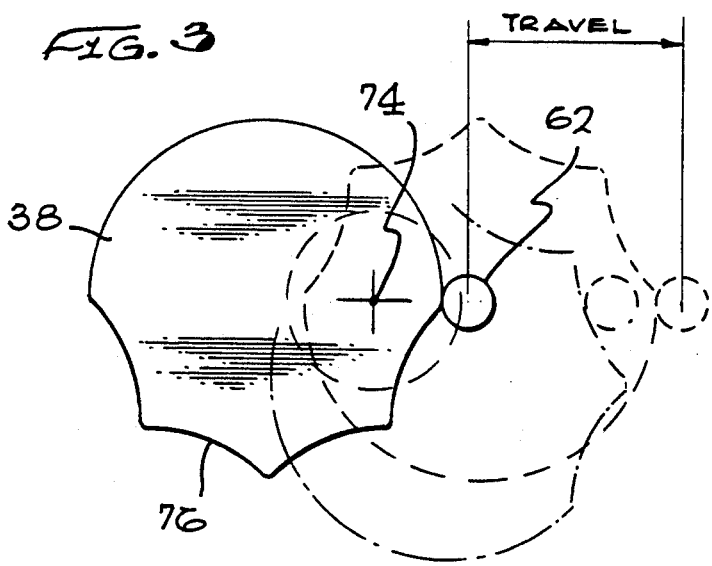
FIG. 3 illustrates the looped cam and cam follower mechanism of FIG. 2.
Figure 2:
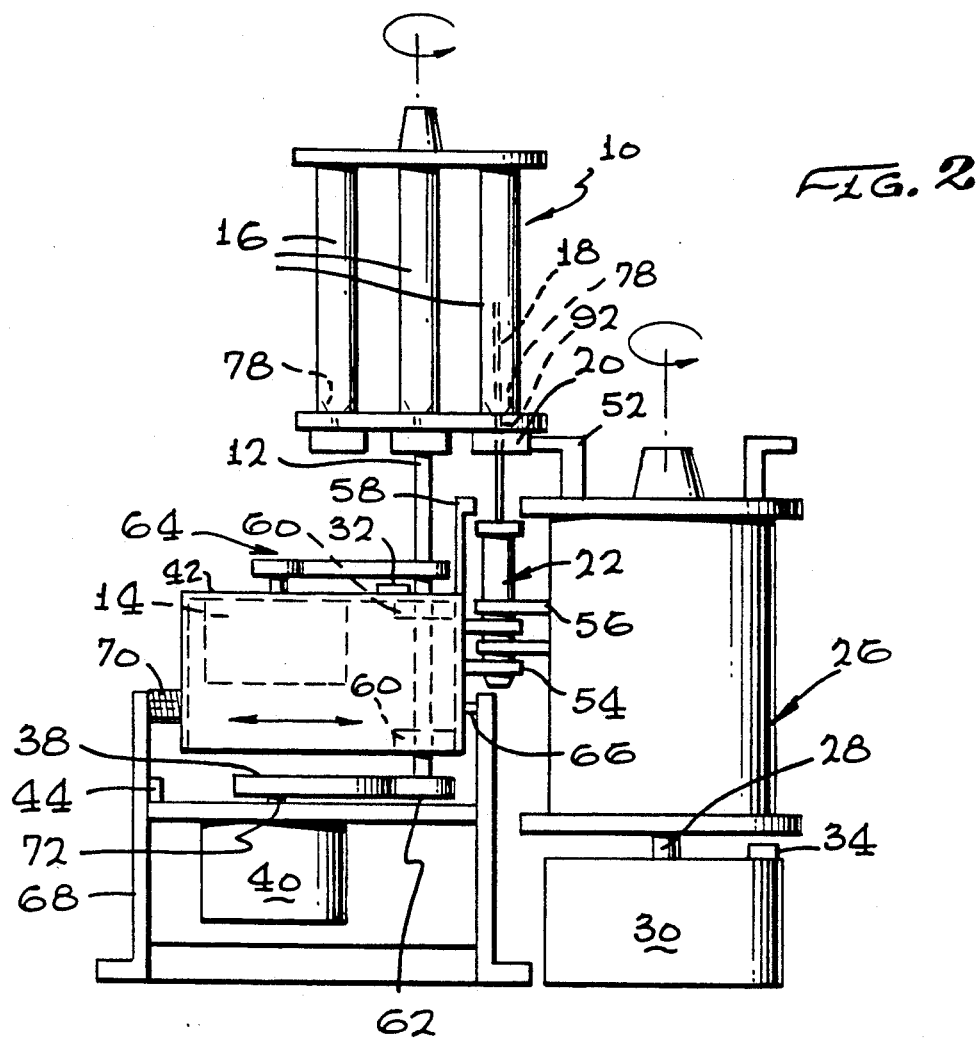
FIG. 2 illustrates in greater detail a first embodiment of the present invention.
Figure 4:
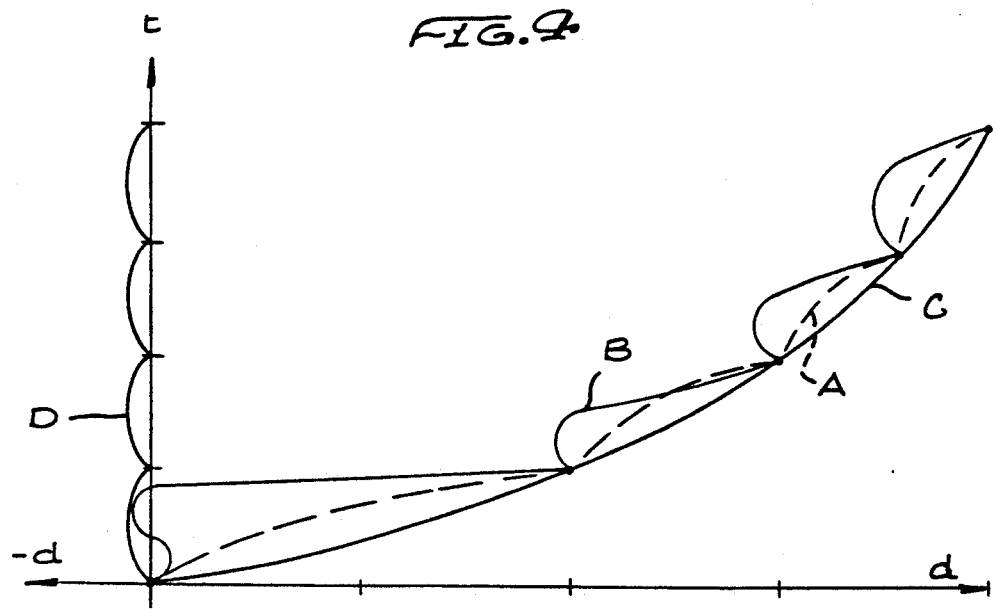
FIG. 4 graphically illustrates the motion of the cam follower and the lead stocker under differing cam configurations.

Referring now to FIG. 2, the first embodiment of the present invention is illustrated in greater detail. Lead stocker 10 is shown mounted on shaft 12 which is supported by bearings 60 and has a cam follower 62 at the lower end thereof. Bearings 60 are coupled to support 42 carrying motor 14 which rotatably drives the shaft 12 by belt and pulley arrangement 64. Support 42 is slidably mounted on bars 66 coupled to support 68 and is spring-loaded by tension spring 70 in an initial position where the lead stocker 10 does not interact with lead holder carousel 26. Support 68 also carries motor 40 which drives shaft 72 on which is mounted cam 38. As is shown in FIGS. 3 and 4, cam 38 is eccentrically mounted to rotate around point 74 and has an initial position sensed by sensor 44 where cam follower 62, and thus shaft 12 and lead stocker 10, are furthest from carousel 26. When cam 38 is driven by motor 40 it causes cam follower 62, and lead stocker 10, to travel or translate towards carousel 26 and then to return under the urging of tension spring 70. Since, as described previously, cam 38 has a plurality of loops 76 thereon, cam follower 62, and lead stocker 10, has an irregular translational motion imparted to it by cam 38 and follows a path in time shown by curves A or B in FIG. 4. Curve A illustrates the result of cam 38 having a plurality of shallow loops 76 so that cam follower 62 and lead stocker 10, while slowing down and speeding up, always has a forward motion toward carousel 26. When, however, the loops 76 are made deep enough, cam follower 62, and lead stocker 10, will actually reverse direction under the urging of tension spring 70 before being forced again to translate toward carousel 26 by cam 38. Since cam 38 has loop 76 only on one side thereof, as shown in FIG. 3, cam follower 62, and lead stocker 10, will follow smooth curve C of FIG. 4 on its return to its initial position.

Figure 5:
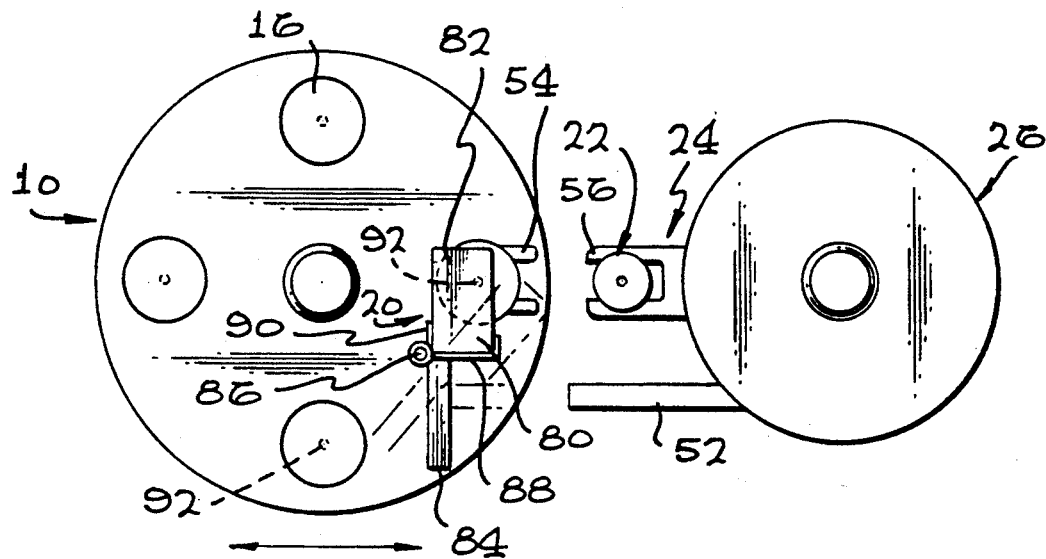
FIG. 5 illustrates in detail the operation of the lead actuator mechanism of the lead stocker.

Thus, in operation, cam 38 is actuated by plotter control 36 and interacts with cam follower 62 to cause shaft 12, support 42 and lead stocker 10 to translate toward carousel 26 while simultaneously imparting a vibrational motion to lead stocker 10. This vibrational motion causes one of the plurality of leads 18 in chambers 16 to enter the conical shaped portions 78 of chambers 16 and thus be in position to be released by lead actuator mechanism 20 into lead holder 22 when all elements are properly positioned. As stated previously, when the lead stocker 10 and the carousel 26 approach one another, the lead actuator mechanism 20 is engaged by pusher rod 52. Since carousel 26 is rotatable, there will in general be one pusher rod 52 for each lead holder 22. As is shown in greater detail in FIG. 5, the lead holder 22 is held by finger mechanism 24 and index features 56 extending from carousel 26 along with pusher rod 52. Lead actuator mechanism 20 is shown consisting of an actuator body 80 having a cover portion 82 and an arm portion 84. The actuator body 80 is coupled to lead stocker 10 by pin 86 and rotates around the center of pin 86. A torsional spring 88 is also coupled to the lead stocker 10 by pin 86 and is positioned at one end by spring locator stop 90, which also acts as a stop for actuator body 80, and is engaged at the other end by actuator body 80. In its first condition or position, the lead actuator mechanism 20 covers the exit hole position 92 of conical shaped portion 78 of chamber 16. When the lead stocker 10 is sufficiently close to the carousel 26, pusher rod 52 engages are portion 84 of actuator body 80 imparting a clockwise motion thereto around pin 86 against the force of torsional spring 88. Cover portion 82 of actuator body 80 also rotates clockwise and thus moves into position to begin to expose the exit hole portion 92 of conical shaped portion 78 of chamber 16. As lead stocker 10 and carousel 26 move closer toward one another and lead holder 22 is engaged by index features 54 extending from lead stocker 10, rod pusher 52 causes arm portion 84 and cover portion 82 to further rotate and begin to expose exit hole potion 92. When sensor 44 senses that cam 38 has moved all elements into their final and proper position, sensor 44 sends a signal to plotter control 36 to stop cam motor 40. At this time, lead actuator mechanism 20 has changed to a second condition or position where exit hole portion 92 is fully exposed and lead 18 drops into lead holder 22. Lead stocker 10 and carousel 26 then disengage, as described above, and torsional spring 88 causes actuator body 80 to return to its initial condition or position and cover exit hole portion 92.

Figure 6:
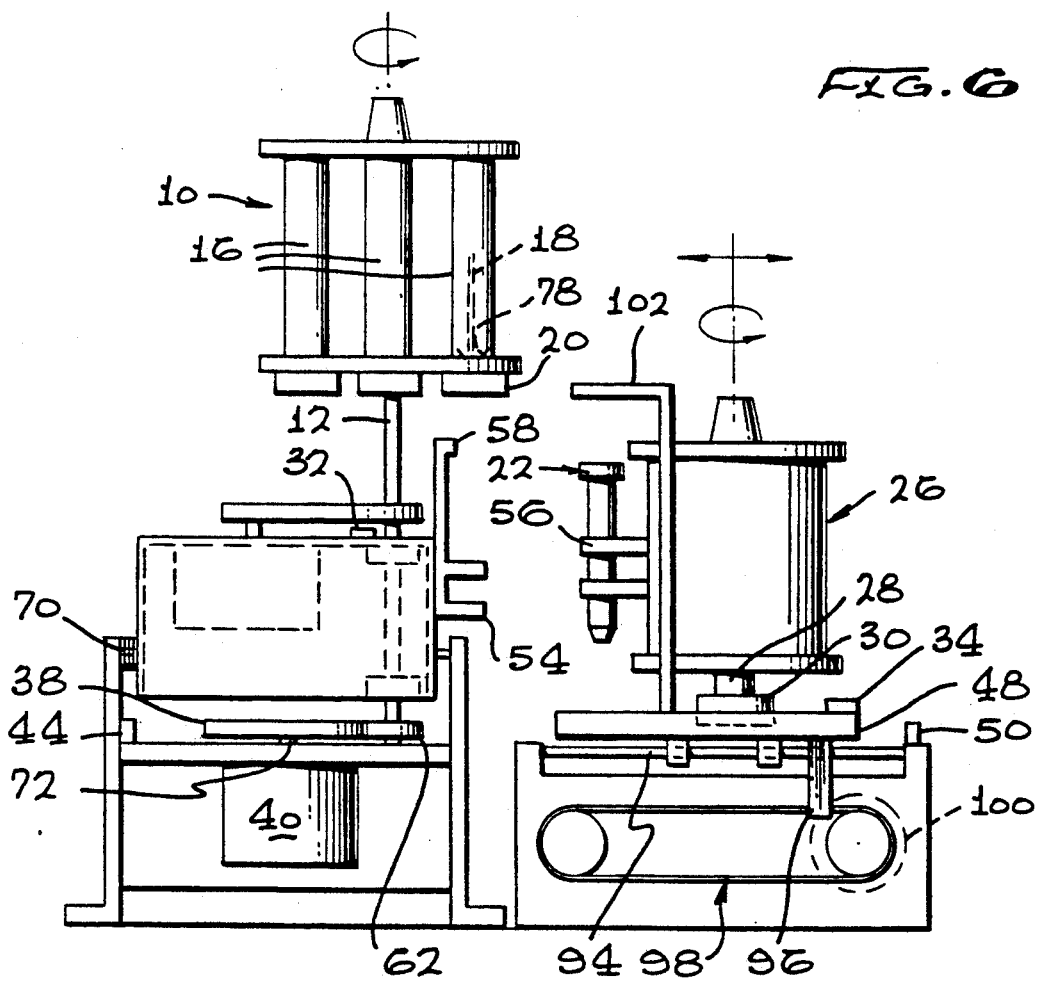
FIG. 6 illustrates a second embodiment of the present invention.

In FIG. 6, a second embodiment of the invention is illustrated. In this embodiment, carousel 26, shaft 28 and motor 30 are mounted on slider mechanism 48. Slider mechanism 48 rides on bars 94 and is coupled by dependant portion 96 to a belt and pulley arrangement 98 driven by motor 100. Slider mechanism 48 also has coupled to it a pusher rod 102 which is adapted to engage lead actuator mechanism 20. Thus carousel 26 and slider mechanism 48 act as a unitary mechanism which supports lead holder 22 and is configured to engage lead actuator mechanism 20. In operation, motor 100 in response to a signal from plotter control 36, which in turn is receiving signals from sensor 50, drives carousel 26 toward lead stocker 10 until, as described previously, lead holder 22 is positioned by index features 54, 56 and pusher rod 102 has fully engaged lead actuator mechanism 20 causing lead 18 to drop from chamber 16 into lead holder 22. During the period of travel by carousel 26 toward lead stocker 10, plotter control 36 has also actuated motor 40 to drive cam 38. In this embodiment, however, cam 38 is mounted concentrically on shaft 72 and thus cam follower 62, shaft 12 and lead stocker 10 do not translate but merely vibrate, as shown by curve D in FIG. 4, during each period of travel in order to cause one of the plurality of leads 18 in chambers 16 to enter the conical shaped portions 78 of chambers 16.

While the invention has been described with reference to particular embodiments, it should be understood that the embodiments are merely illustrative as there are numerous variations and modifications which may be made by those skilled in the art. Thus, the invention is to be construed as being limited only by the spirit and scope of the appended claims.

I claim:

1. A lead positioner for a pencil plotter comprising:
    a lead stocker containing a plurality of leads for use in a pencil plotter;
    a lead actuator mechanism coupled to said lead stocker for releasing said leads into a lead holder; and
    shaker means coupled to said lead stocker for imparting a vibrational motion to said lead stocker prior to said lead actuator mechanism releasing said leads to enable said leads to be released individually into said lead holder, said shaker means including a looped cam positioned to engage said lead stocker and means for rotationally driving said cam to cause said cam to have a rotational motion so as to impart said vibrational motion to said lead stocker.

2. The lead position of claim 1 further comprising sensor means for sensing a position of said cam and means for receiving an output of said sensor means and controlling said rotational motion of said cam in response thereto to provide said vibrational motion prior to said lead actuator mechanism releasing said leads.

3. A lead positioner for a pencil plotter comprising:
    a lead stocker containing a plurality of leads for use in a pencil plotter;
    a lead actuator mechanism coupled to said lead stocker for releasing said leads into a lead holder; and
    shaker means coupled to said lead stocker and including an eccentrically mounted looped cam for imparting a vibrational motion to said lead stocker prior to said lead actuator mechanism releasing said leads to enable said leads to be released individually into said lead holder and for providing a translational motion to said lead stocker to align said leads and said lead holder, said eccentrically mounted looped cam being positioned to engage said lead stocker, said shaker means further including means for rotationally driving said cam to cause said cam to have a rotational motion so as to impart said vibrational and translational motion to said lead stocker.

4. The lead positioner of claim 3 further comprising sensor means for sensing a position of said cam and means for receiving an output of said sensor means and controlling said rotational motion of said cam in response thereto to provide said vibrational motion and align said leads and said lead holder prior to said lead actuator mechanism releasing said leads.

5. A lead positioner for a pencil plotter comprising:
    a lead stocker containing a plurality of leads for use in a pencil plotter;
    a lead actuator mechanism coupled to said lead stocker for releasing said leads into a lead holder translationally spaced from said lead stocker; and
    a shaker mechanism coupled to said lead stocker and imparting a vibrational motion to said lead stocker prior to said lead actuator mechanism releasing said leads to enable said leads to be released individually into said lead holder and a translational motion to said lead stocker to cause said lead stocker to travel toward said lead holder to align said leads and said lead holder.

6. The lead positioner of claim 5 wherein said lead stocker is mounted on a slidable, spring-loaded support to enable said lead stocker to travel toward said lead holder.

7. The lead positioner of claim 5 wherein said shaker mechanism further imparts a translational motion to said lead stocker to enable said lead actuator mechanism to release said leads into said lead holder.

8. The lead positioner of claim 7 wherein said shaker mechanism includes an eccentrically mounted looped cam positioned to engage said lead stocker and means for rotationally driving said cam to impart said vibrational and translational motion to said lead stocker.

9. The lead positioner of claim 7 wherein said lead actuator mechanism interacts with a lead holder support to cause the release of said leads into said lead holder and said translational motion of said lead stocker causes said lead actuator mechanism to interact with said lead holder support.

* * * * *